3,654,265
SYNTHETIC PENICILLIN

John Michael Essery, Fayetteville, and Janet Ruth West, Manlius, N.Y., assignors to Bristol-Myers Company, New York, N.Y.
No Drawing. Filed Nov. 27, 1970, Ser. No. 93,438
Int. Cl. C07d 99/12
U.S. Cl. 260—239.1   6 Claims

ABSTRACT OF THE DISCLOSURE

Pivaloyloxymethyl 6 - (D -α - sulfoaminophenylacetamido)penicillanate sodium salt (I) is a valuable antibiotic agent, nutritional supplement in animal feed, therapeutic agent in poultry and animals, including man, and is especially useful in the treatment of infectious diseases caused by Gram-positive and Gram-negative bacteria, most particularly those caused by the Pseudomonas genus. Sodium pivaloyloxymethyl 6-(D-α-sulfoaminophenylacetamido)penicillanate is prepared by the treatment of disodium 6-(D-α-sulfoaminophenylacetamido)penicillanate (II) with chloromethyl pivalate in hexamethylphosphortriamide. Compound I has a similar antibacterial spectrum to that of compound II but is absorbed from the gastro-intestinal tract 2–3 fold more efficiently than compound II.

BACKGROUND OF THE INVENTION (1) Field of the invention

The penicillins of the present invention are compounds particularly useful in the treatment of Pseudomonas infections.

(2) Description of the prior art

The compounds of the present invention are new and novel. The closest representative art can be found in:

(A) U.S. Pat. No. 3,381,001, issued Apr. 30, 1968, describes and claims disodium 6-(D-α-sulfoaminophenylacetamido)penicillanate;

(B) Belgian Pat. No. 721,515, issued Mar. 27, 1969, (Farmdoc No. 36,795F) describes the acetoxymethyl and pivaloyloxymethyl esters of ampicillin. This patent corresponds to South African Pat. No. 68/5,952;

(C) W. V. Daehne et al., J. Med. Chem., 13, No. 4, 607 (1970), describes the synthesis of readily hydrolyzable esters, particularly the pivaloyloxymethyl ester of ampicillin, and its superior blood levels as compared to ampicillin via the oral route. This article also also summarizes some previous publications on rapidly hydrolyzed esters;

(D) Other patents and publications which are relevant to penicillin esters that are readily hydrolyzed are Belgian Pat. No. 684,288, U.S. Pat. Nos. 3,250,679, 2,578,-570 and 3,399,207, Jansen et al., J. Chem. Soc., 2127 (1965) and British Pat. No. 1,003,479; and (E) N. J. Leonard and M. Rasmussen, Paper 45, American Chemical Society Abstracts, 153rd Meeting, Apr. 9–14, 1967 describe the use of a pivaloyloxymethyl group as a readily removable protecting group.

SUMMARY OF THE INVENTION

Compounds having the formula

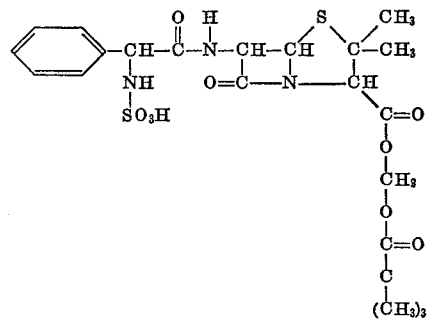

in which X is hydrogen or a nontoxic metallic cation such as sodium, potassium, calcium, aluminum, and the like, the ammonium cation and substituted ammonium cations, e.g., cations of such nontoxic amines at tri(lower) alkylamines, i.e., triethylamine, etc., procaine, dibenzylamine, N-benzyl-betaphenethylamine, 1-ephenamine, N, N'-dibenzylethylenediamine, dehydroabietylamine, N,N'-bis-dehydroabietylethylenediamine, N-(lower)alkylpiperidine, e.g., N-ethylpiperidine, or other such amines which have been used to form pharmaceutically acceptable nontoxic salts with benzylpenicillin, are prepared by the treatment of the compound having the formula

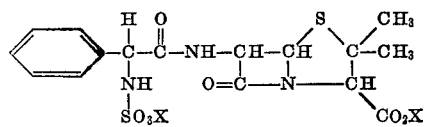

in which X is defined as above, with at least an equimolar quantity of chloromethyl pivalate in hexamethylphosphortriamide or the like to produce Compound I.

DETAILED DESCRIPTION

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and more particularly, relates to pivaloyloxymethyl 6-(D-α-sulfoaminophenylacetamido)penicillanate and the pharmaceutically acceptable salts thereof.

Antibacterial agents such as ampicillin (U.S. Pat. No. 2,985,648) have proved highly effective in the past in the therapy of infections due to Gram-positive and Gram-negative bacteria but these compounds have been notably lacking in their ability to effectively control Pseudomonas infections.

More recently the compound known as carbenicillin which has the formula

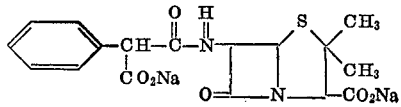

has been marketed commercially as a broad spectrum penicillin for parenteral use which possesses good antipseudomonal activity.

Similarly, the compound known as 6-(D-α-sulfoaminophenylacetamido)penicillanic acid disodium salt which has the formula

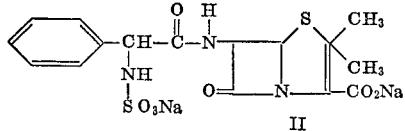

has been described as possessing good antipseudomonal activity in U.S. Pat. No. 3,381,001. As with carbenicillin, this compound was not particularly effective by oral administration due to its poor absorption and resultant low blood levels.

It was therefore an object of the present invention to provide compounds useful in the treatment of infections caused by Gram-positive and Gram-negative bacteria, including particularly those caused by *Pseudomonas aeruginosa*, which are useful upon oral administration.

The compounds of the present invention are particularly useful in that they possess antibacterial activity against both Gram-positive and Gram-negative bacteria, and most particularly exhibit activity against *Pseudomonas aeruginosa* infections upon oral administration.

The objects of the present invention have been achieved by the provision of a member selected from the group of compounds having the formula

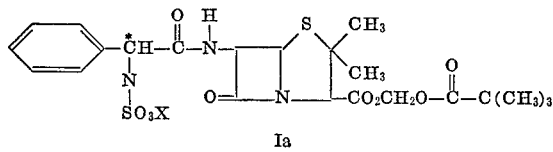

in which X is hydrogen or a pharmaceutically acceptable, nontoxic cation selected from the group consisting of nontoxic metallic cations such as sodium, potassium, calcium, aluminum, and the like, the ammonium cation and substituted ammonium cations, e.g., cations of such nontoxic amines as tri(lower)alkylamines, i.e., triethylamine, etc., procaine, dibenzylamine, N-benzyl-betaphenethylamine, 1-ephenamine, N,N' - dibenzylethylenediamine, dehydroabietylamine, N,N'-bis-dehydroabietylethylenediamine, N-(lower)alkylpiperidine, e.g., N-ethylpiperidine, or other such amines which have been used to form pharmaceutically acceptable nontoxic salts with benzylpenicillin.

The α-carbon atom of acyl group (to which the α-amino group is attached) is an asymmetric carbon atom (*) and the compounds of this invention can therefore exist in two optically active isomeric forms [the D- and L-diastereoisomers], as well as in the DL form which is a mixture of the two optically active forms; all such isomeric forms of the compounds are included within the scope of the present invention.

The compounds of the present invention are prepared by the process of mixing a compound having the formula which comprises

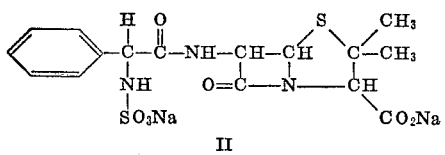

or a mono- or polyhydrate thereof, in a ratio of at least one molar equivalent of chloromethyl pivalate per equivalent of compound II, but preferably about an equimolar quantity, in an organic solvent, preferably hexamethylphosphortriamide, for a period of time of at least one hour, but preferably more than 5 hours, with stirring at about room temperature to produce the compound having the formula

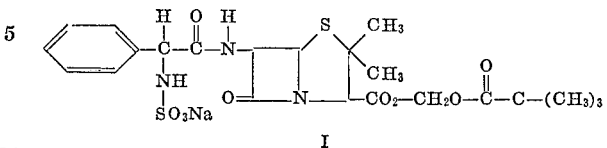

An alternative process for the preparation of compound I comprises the consecutive steps of (A) Mixing a compound having the formula

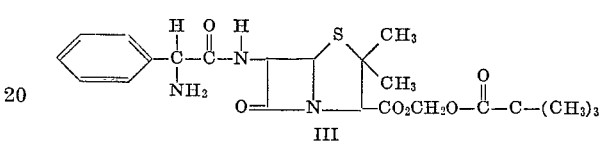

or a mono- or polyhydrate thereof, in a ratio of at least one molar equivalent of trimethylamine-sulfur trioxide per equivalent of compound III, but preferably about a 10% excess, in an organic solvent, but preferably dry methylene chloride, at an initial temperature of about 0° C. for at least 30 minutes, followed by gradual warming to room temperature; and treating the above compound with a pharmaceutically acceptable base, in a ratio of about one to three moles of base per mole of compound, the base being characterized as a "readily available" source of pharmaceutically acceptable nontoxic cations, or as being capable of forming pharmaceutically acceptable ammonium or substituted ammonium cations to produce compounds having Formula Ia.

"Readily available" source of pharmaceutically acceptable non-toxic cations such as sodium, potassium, calcium, aluminum, or the like, is defined for the purpose of the present invention to mean: a hydroxide, i.e., sodium hydroxide, calcium hydroxide, ammonium hydroxide, or the like; a weak acid salt of a strong base, i.e., sodium or potassium 2-ethylhexanoate, or the like; a pharmaceutically acceptable non-toxic amine capable of forming a substituted ammonium cation, i.e., a tri(lower)alkylamine, procaine, dibenzylamine, N-benzyl-beta-phenethylamine, 1-ephenamine, N,N'-dibenzylethylenediamine, dehydroabietylamine, N,N' - bis - dehydroabietylethylenediamine, N-(lower)alkylpiperidine, or other such amines which have been used to form pharmaceutically acceptable nontoxic salts with benzylpenicillins.

The salts of the present invention can be prepared by stoichiometric titration under anhydrous conditions in an anhydrous solvent by the use of one mole respectively of an anhydrous base such as sodium or potassium 2-ethylhexanoate in 1-butanol or the like, or an organic base, such as trialkylamine, dibenzylamine, and the others heretofore mentioned. The salts can also be formed in an aqueous solution.

The mono salt (sulfamate) is a stable salt and remains as such in aqueous media at a pH as low as 1.

In the treatment of bacterial infections in man, the compounds of this invention are administered topically, orally and parenterally, but preferably orally, in accordance with conventional procedures for antibiotic administration in an amount of from about 5 to 125 mg./kg./day and preferably in the range of 35 to 85 mg./kg./day for Pseudomonas infections in divided dosages, e.g., three or four times a day. They are administered in dosage units containing, for example, 250, 500, 1000 and 2000 mg. of active ingredient with suitable physiologically acceptable carriers or excipients. The dosage units can be in the form of liquid preparations such as solutions, dispersions, emulsions or in solid form such as tablets, capsules, etc.

A preferred embodiment of the present invention is the compounds having the formula

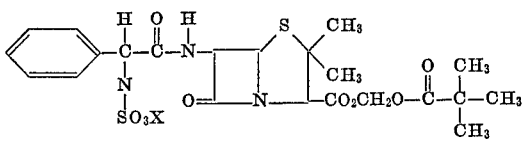

wherein X is hydrogen or a pharmaceutically acceptable, nontoxic cation; or a hydrate thereof.

Another preferred embodiment is the "D" isomers of the compounds having the formula

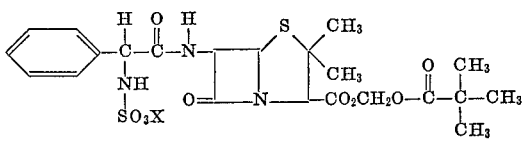

wherein X is hydrogen or a pharmaceutically acceptable, nontoxic cation; or a hydrate thereof.

A more preferred embodiment is the "D" isomers of the compounds having the formula

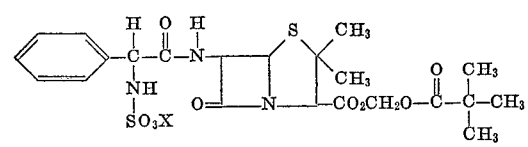

wherein X is sodium or potassium; or a hydrate thereof.

A most preferred embodiment is the sodium or potassium salt of pivaloyloxymethyl 6-(D-α-sulfoaminophenylacetamido)penicillanate monohydrate.

Another most preferred embodiment is the sodium or potassium salt of pivaloyloxymethyl 6-(D-α-sulfoaminophenylacetamido)penicillanate dihydrate.

Urine recovery studies were conducted to determine the relative oral absorption of compound I [pivaloyloxymethyl 6 - (D-α-sulfoaminophenylacetamido)penicillanate sodium salt] and compound II [6-(D-α-sulfoaminophenylacetamido)penicillanic acid disodium salt]. The percent recovery was based on the recovery of the free acid (compound II) found in the urine of the rats to whom it was administered.

It is generally accepted by those knowledgeable in the art that higher percent urine recovery levels are indicative of superior absorption. Accordingly, urine recovery levels can be said to indicate relative degrees of absorption of the drug from the gastro-intestinal tract when the drug is administered orally by gavage.

The concentration of antibiotic in the urine sample was bio-assayed by the template agar diffusion method utilizing Bacillus subtilis ATCC 6633 as the test organism. It was demonstrated that the antibiotic activity found in the urine samples was due to the formation of compound II by the in vivo hydrolysis of compound I. Little, if any, compound I was detected in the urine upon chromatographic analysis.

The result of the studies indicated that the administration of 50 mg./kg. of body weight of compound II produced urine recovery levels of 0.67%. At the same time, the administration of an equimolar quantity of compound I produced urine recovery levels of 2.02%.

The conclusion is thereby drawn that compound I is absorbed from the gastro-intestinal tract 3-fold better than compound II upon oral administration.

The following examples will serve to illustrate this invention without limiting it thereto.

DESCRIPTION OF THE PREFERRED EMBODIMENTS

Example 1

Pivaloyloxymethyl 6 - (D - α - sulfoaminophenylacetamido)penicillanate sodium salt dihydrate.

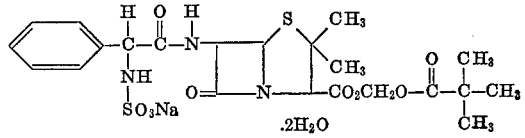

A mixture of 4.6 g. (7.25 mmole) of the p-toluenesulfonic acid salt of pivaloyloxymethyl 6[D - α - aminophenylacetamido]penicillanate [1] and cold (0–5°) 3% aqueous sodium bicarbonate solution (28 ml.) was shaken with two 40 ml. portions of ethyl acetate. The organic phases were combined, washed with cold water, dried over magnesium sulfate and the solvent was removed under reduced pressure. The residual oil was dissolved in 80 ml. dry methylene chloride and the solution was cooled to 0°. To the stirred solution was added in portions over a 5 minute period 1.1 g. (8 mmole) of trimethylamine-sulfur trioxide. The reaction mixture was stirred for 35 minutes at 0–5° and for 45 minutes without external cooling. After removal of undissolved material by filtration, the volume of the filtrate was reduced to approximately 5 ml. under reduced pressure. The solution was diluted with 5 ml. of acetone, re-filtered, and added dropwise to a stirred solution of 1.2 g. (7.25 mmole) of sodium 2-ethylhexanoate in 10 ml. acetone. After 30 minutes at room temperature, the solution was diluted with Skellysolve B (petroleum solvents, essentially n-hexane). This mixture was stirred for 30 minutes at 0–5° and the solvents were then removed under reduced pressure. The residual gum was solidified by trituration with Skellysolve B, and the solid was dissolved in ethyl acetate and reprecipitated with Skellysolve B to provide a white amorphous solid, M.P. 168–172° dec. The infrared (IR) spectrum (KBr disc) had absorption maxima (cm.$^{-1}$) at 3500–3300 (OH and NH); 1790–1760 (β-lactam and ester carbonyls; 1680 (amide); 1200 and 1050 ($SO_3^-$); 1110 (ester C—O—C); 705 (phenyl). The nuclear magnetic resonance spectrum of a solution of the ester in deuterium oxide and $d_6^-$ dimethylsulfoxide (1:1) showed absorptions [p.p.m. (δ) from tetramethylsilane] which were assigned as follows: singlet (5H) at 7.39 due to the benzene ring protons; AB pattern at 5.7–5.95 (2H) due to the ester methylene protons; singlet (2H) at 5.52 for the β-lactam protons; singlet (1H) at 4.99 due to the benzylic proton; singlet (1H) at 4.52 for the proton at $C_3$ of the penicillin nucleus; singlets (6H) at 1.4 and 1.56 for the gem-dimethyl group; singlet (9H) at 1.18 due to the protons of the t-butyl group.

Analysis.—Calc'd for $C_{22}H_{28}N_3O_9S_2Na \cdot 2H_2O$ (percent): C, 43.91; H, 5.36; N, 6.98; $H_2O$, 5.98. Found (percent): C, 43.31; H, 5.50; N, 6.82; $H_2O$, 4.71.

Example 2

Pivaloyloxymethyl 6 - (D - α - sulfoaminophenylacetamido)penicillanate sodium salt.—A slurry of 5.0 g. (.01 mole) of disodium 6-(D - α - sulfoaminophenylacetamido)penicillanate (assumed to be a sesquihydrate) in 100 ml. hexamethylphosphortriamide was treated with 1.5 g. (.01 mole) of chloromethyl pivalate. The mixture was stirred for 17 hours at room temperature. The resulting turbid solution was added dropwise to 2 l. of cold (0–5°) Skellysolve B to provide a gum. The solvents were decanted and the gum was dissolved in ethyl acetate.

---

[1] Prepared from D-(—)-phenylglycyl chloride hydrochloride and the p-toluenesulfonic acid salt of pivaloyloxymethyl 6-aminopenicillanate in the manner described by W. V. Daehne et al., J. Med. Chem., 13, 607 (1970). These workers used the hydrochloride salt of the ester.

After filtration through filter aid, the solvent was removed under reduced pressure and the residue was solidified by trituration with Skellysolve B to provide 4.3 g. (71%) of product. IR and NMR spectra showed this was the title compound contaminated with hexamethylphosphortriamide. The product can be purified by reprecipitation from ethyl acetate-Skellysolve B.

Example 3

Pivaloyloxymethyl 6 - (D - α - sulfoaminophenylacetamido)penicillanate sodium salt monohydrate.—To a slurry of 4.5 g. (8.5 mmole) of disodium 6-(D-α-sulfoaminophenylacetamido)penicillanate trihydrate in 95 ml. of hexamethylphosphortriamide was added 1.28 g. (8.5 mmole) of chloromethyl pivalate. The mixture was stirred for 18 hours and was then slowly added with stirring to 2 l. Skellysolve B. The solvent was decanted from the gum which precipitated and the gum was dissolved in ethyl acetate. This solution was filtered through a filter aid and the solvent was removed under reduced pressure to provide an oil which was solidified by trituration with Skellysolve B. The solid was dissolved in ethyl acetate, filtered and the filtrate diluted with Skellysolve B. On standing at room temperature, the ester slowly precipitated to give 1.3 g. of an amorphous solid, M.P. 158–160° dec. Infrared spectrum (KBr disc) had absorption maxima (cm.$^{-1}$) at 3500–3280 (OH and NH); 1785–1760 (β-lactam and ester carbonyls); 1680 (amide carbonyl); 1210 and 1050 ($SO_3^-$); 1120 (ester C—O—C); 700 (phenyl). The NMR spectrum of a solution of the ester in deuterium oxide showed absorptions [p.p.m. (δ) from tetramethylsilane] which were assigned as follows: broad peak (5H) at 7.1–7.68 due to the benzene ring protons; multiplet (4H) at 6.1–5.33 for the ester methylene protons and the β-lactam ring protons; singlet (1H) at 5.1 due to the benzylic proton; singlet (1H) at 4.55 for the proton at $C_3$ of the penicillin nucleus; singlets (6H) at 1.47 and 1.33 for the gem-dimethyl group; singlet (9H) at 1.12 for the t-butyl group protons.

*Analysis.*—Calc'd for $C_{22}H_{28}N_3O_9S_2Na \cdot H_2O$ (percent): C, 45.28; H, 5.18; N, 7.20; $H_2O$, 3.07. Found (percent) C, 44.93; H, 5.34; N, 7.60; $H_2O$, 4.0.

A second crop of 0.57 g. was obtained; $[\alpha]_D^{24}$ +124° (c. 1.0, $H_2O$).

We claim:
1. A compound having the formula

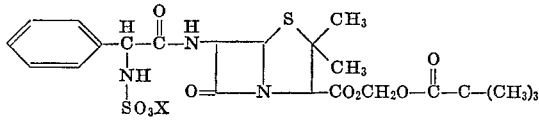

wherein X is hydrogen or a pharmaceutically acceptable, nontoxic cation; or a hydrate thereof.

2. A compound of claim 1 having the D configuration.

3. A compound of claim 2 wherein X is a pharmaceutically acceptable, nontoxic cation.

4. A compound of claim 3 wherein X is sodium or potassium.

5. The monohydrate of a compound of claim 4.

6. The dihydrate of a compound of claim 4.

References Cited
UNITED STATES PATENTS 3,381,001   4/1968   McGregor _____ 260—239.1

NICHOLAS S. RIZZO, Primary Examiner

U.S. Cl. X.R.

424—271